May 3, 1966 R. J. FURLONG 3,249,924

ASYNCHRONOUS DATA PROCESSING SYSTEM

Filed Dec. 31, 1962 3 Sheets-Sheet 1

INVENTOR.
R. J. FURLONG
BY
Sughrue, Rothwell, Mion, and Zinn
ATTORNEYS

BUFFER 16 ADDRESS ORGANIZATION

| BYTE | ADDRESS |
|---|---|
| $A_1$ | 0 THRU 7 |
| $B_1$ | 32 " 39 |
| $DCW_1$ | 64 " 71 |
| $A_2$ | 8 THRU 15 |
| $B_2$ | 40 " 47 |
| $DCW_2$ | 72 " 79 |
| $A_3$ | 16 THRU 23 |
| $B_3$ | 48 " 55 |
| $DCW_3$ | 80 " 87 |
| $A_4$ | 24 THRU 31 |
| $B_4$ | 56 " 63 |
| $DCW_4$ | 88 " 95 |

United States Patent Office 3,249,924
Patented May 3, 1966

3,249,924
ASYNCHRONOUS DATA PROCESSING SYSTEM
Robert J. Furlong, Poughkeepsie, N.Y., assignor to International Business Machines Corporation, New York, N.Y., a corporation of New York
Filed Dec. 31, 1962, Ser. No. 248,750
6 Claims. (Cl. 340—172.5)

Figure 1:
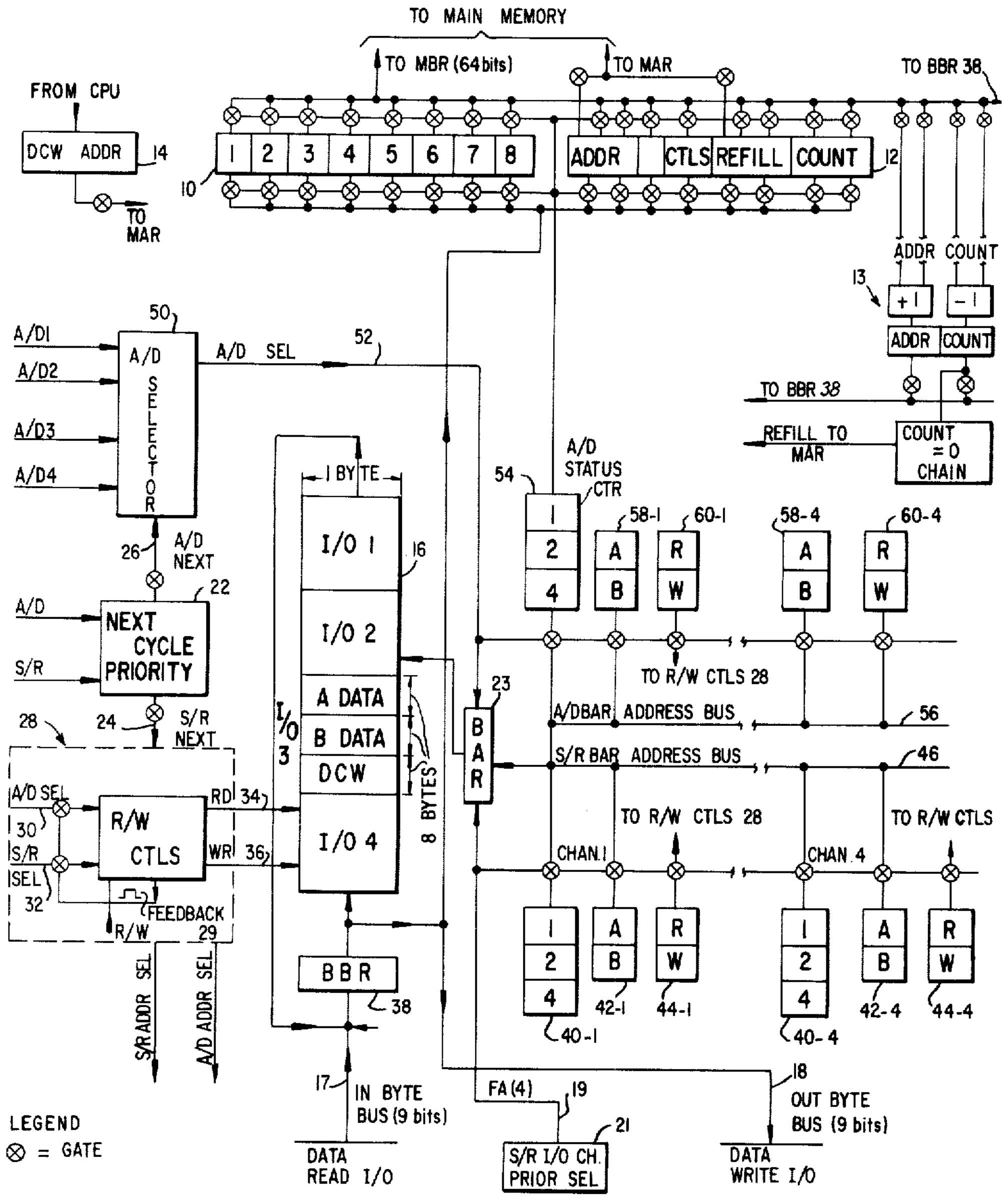

This invention relates broadly to a data processing system and, more particularly, to an asynchronous data processing system for transferring data between a central processing unit and several input-output devices.

In prior multi-channel systems, data is processed through a buffer on a regenerative basis; that is, data is processed synchronously or periodically so that one half of each timing cycle is utilized to regenerate data in the buffer storage. Consequently, during a read-only or write-only operation, the buffer cannot be used on the second half of a read or write cycle. Other buffer systems have used sequential write-only or read-only timing cycles, but they have not provided for randomly intermixing such cycles.

Therefore, a principal object of this invention is to provide an asynchronous data processing system wherein read-only and write-only cycles may be randomly intermixed.

Another object of this invention is to provide an asynchronous data processing system wherein computer words are converted to bytes and stored in a byte buffer which is randomly addressable on a byte basis whereby the bytes are transmitted to plural input-output channels.

A further object is to provide an asynchronous data processing system wherein plural input-output channels may be randomly addressed to transfer data bytes therefrom to a byte buffer which may be randomly addressed to assemble the bytes in computer words for transmission to a central processing unit.

Still another object of this invention is to provide an asynchronous data processing system including a byte buffer whose addressing controls for a subsequent cycle may be set up prior to the termination of a current cycle.

Another object of this invention is to provide an asynchronous data processing system wherein plural input-output channels are controlled by individual byte status units for controlling the processing of data between a central processing unit and the input-output channels through a byte-size buffer.

A further object is to provide an asynchronous data processing system having a byte buffer which operates on read-only and write-only cycles at twice the speed of standard synchronous data processing systems.

A more specific object of this invention is to provide an asynchronous data processing system including a byte buffer subject to random read-only and write-only operations wherein a channel service request from one of a plurality of input-output channels interrupts at the end of a byte cycle a main memory operation involving the use of the byte buffer.

The foregoing objects are realized in the preferred embodiment of this system as disclosed in the following detailed description and accompanying drawings and which may be summarized briefly as follows: This system provides broadly for the asynchronous transmission of data between a plurality of simultaneously operating input-output devices and the main memory of a central processing unit. An important feature is a byte-size buffer used non-regeneratively for random two-way data transmission using random read-only and write-only cycles. A byte address register controls the processing of data through the byte buffer. The byte buffer has a width of one byte and only one byte is addressed at a time. The buffer operates twice as fast as memories having the same core construction using the conventional regenerative read-write timing cycle. The byte buffer has a separate section allotted to each I/O channel and each section has three word portions, each of which contains eight bytes. The A and B word portions are used alternately for storing data words. The third word portion is for a data control word from main memory which is up-dated during data transfer between the main memory and the byte buffer. A suitable priority circuit determines which input-output unit is connected to the byte buffer for the transferral of data a byte at a time. Furthermore, the address of the selected input-output channel is set in the buffer address register for selecting the buffer section allocated to the selected input-output channel.

A byte status unit is associated with each input-output channel for controlling the data transfer operations between the channel and the buffer. The byte status unit monitors the number of bytes transferred and also includes a read-write trigger whose condition determines the direction in which data flows between the buffer and the I/O channel. A single status unit is associated with the computer channel and controls the assembly and disassembly of bytes and computer words in operations wherein data is transferred between the main memory and the byte buffer.

Furthermore, this system permits the addressing controls of the byte buffer to be set up during a read or write-cycle of the byte buffer. Accordingly, a next cycle priority circuit is provided for setting up the proper address register for the next read-only or write-only timing cycle before the current cycle has terminated. A service request from any input-output channel has priority for connection to the byte buffer over a word assembly-disassembly operation between the main memory and the byte buffer and the service request can interrupt a main memory operation at the end of any byte cycle. A byte buffer read-write control circuit generates separate read or write clock pulses for timing the operation of the system and also generates a suitable feedback pulse before the end of each byte cycle for permitting the overlapping of the setting-up of the addressing controls of the byte buffer and a byte processing cycle.

Other objects and features of the invention will be pointed out in the following description and claims and illustrated in the accompanying drawings which disclose by way of example the principle of the invention and the best mode which has been contemplated of applying that principle.

Figures 2, 4:
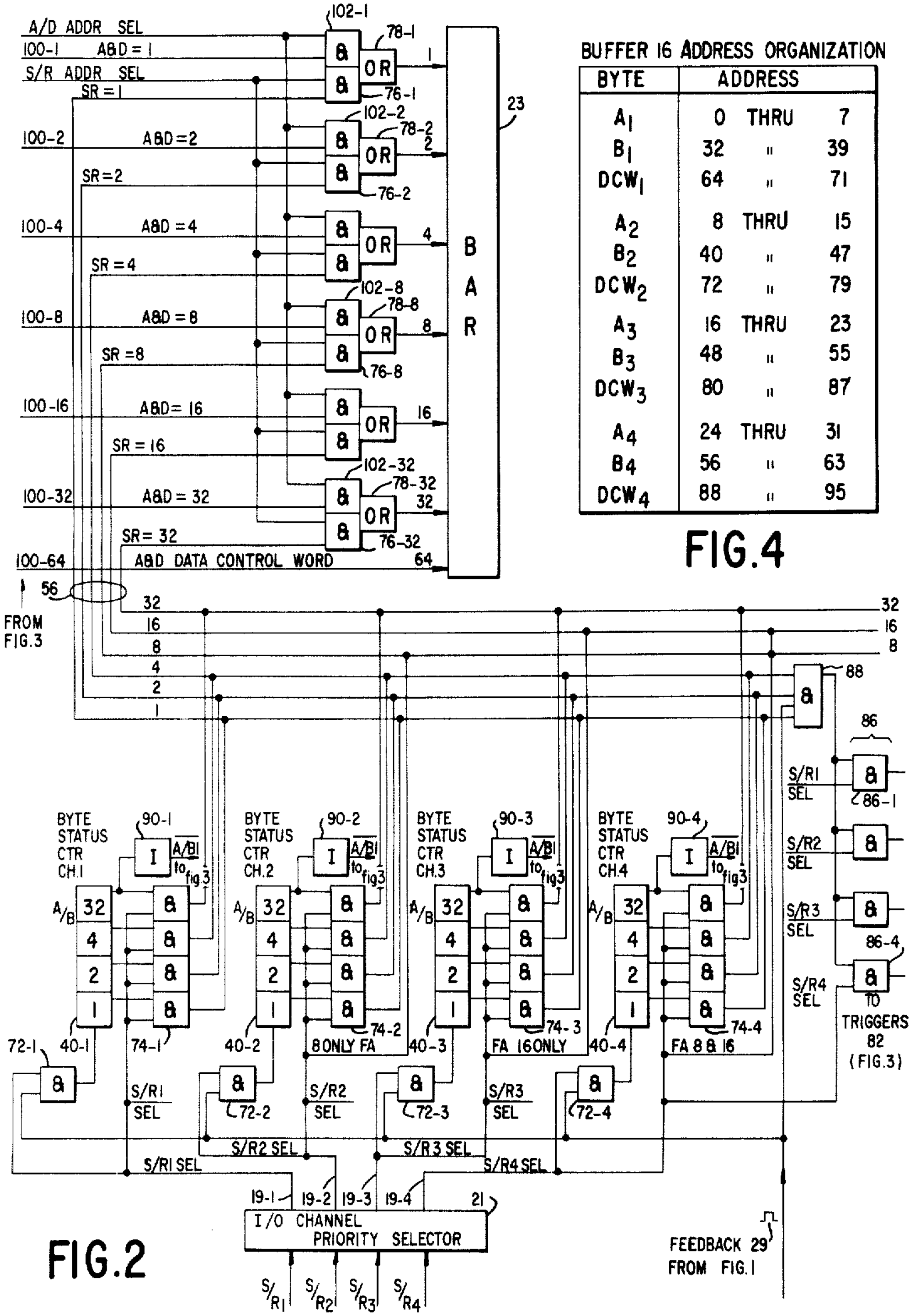
Figure 3:
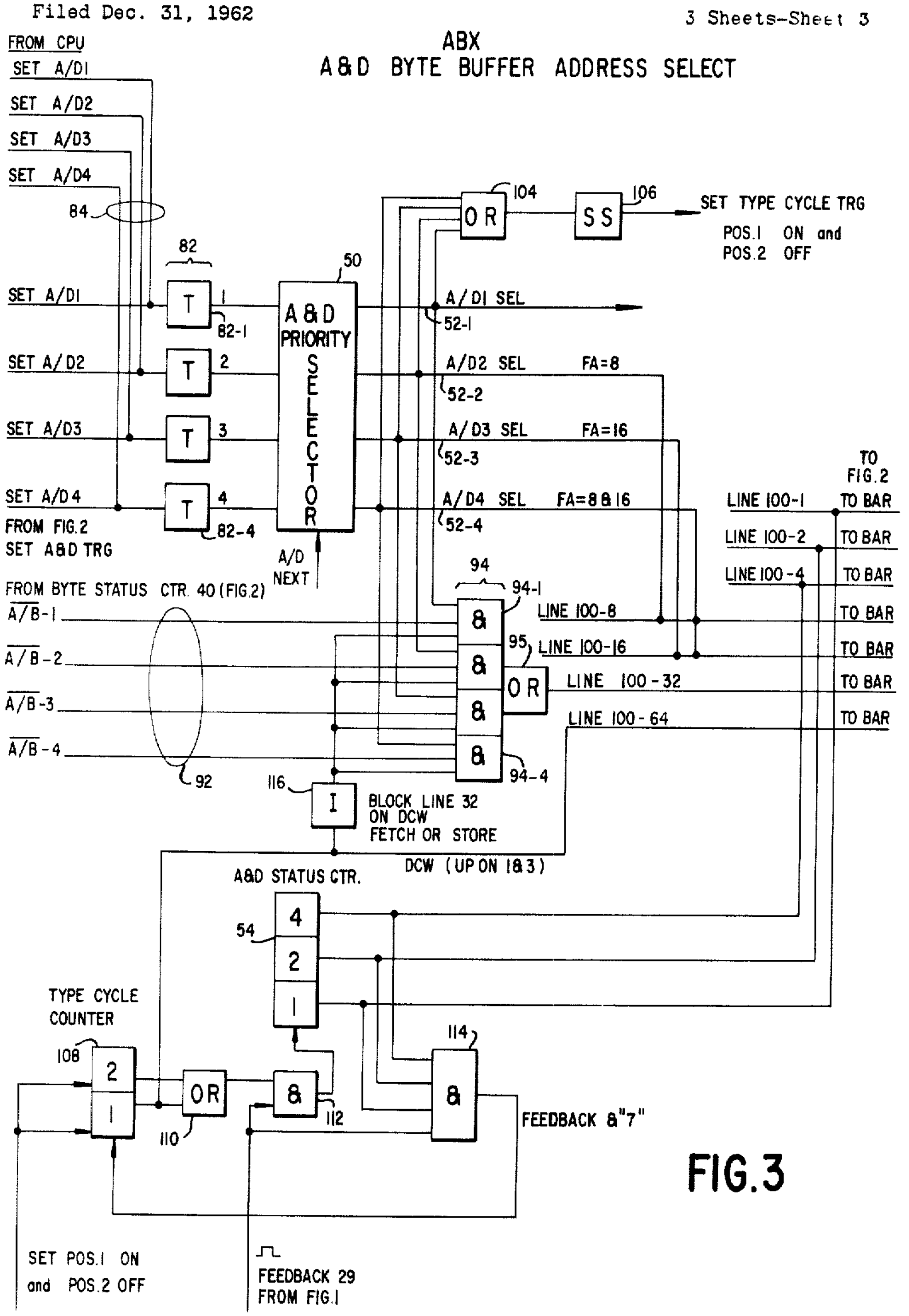

In the drawings:

FIGURE 1 is a block diagram showing the data flow paths, necessary controls, and general organization of an asynchronous processing system embodying this invention;

FIGURE 2 shows in detail the logical circuits for addressing and controlling the flow of data between the byte buffer and the input-output channels in a service request operation; and FIGURE 3 shows the logic circuits for addressing and controlling the flow of data between the byte buffer and the main memory in an assembly-disassembly operation; and FIG. 4 shows the address organization of the byte buffer.

In FIGURE 1 there is shown a block diagram of the general organization of this system including data flow paths and associated controls. In this general type of processing system, there is a central processing unit or CPU (not shown) which has a main memory buffer register or MBR (not shown) for holding a computer data word composed of sixty-four bits which are transferred between the CPU main memory (not shown) and a data word register 10. The CPU also has a main memory address register or MAR (not shown) which holds the address of the word location in main memory either being stored or fetched.

In the present system, the main memory address of a data word is stored in the ADDR field of a Data Control Word (DCW) register 12 which also contains other fields such as a control (CTLS) field, a REFILL and a COUNT field. The circuits indicated generally by the reference numeral 13 cooperate with the fields of the DCW register 12 to modify the DCW during transfer of data to and from the main memory. In general, for each data word read out of memory the ADDR field is incremented by a count of 1 and the COUNT field is decremented by a count of 1. The ADDR field indicates the address in memory where the data word is stored and the COUNT field indicates the number of words to be fetched from memory before the particular DCW is exhausted. For example, if the COUNT is 500, it is decremented 1 each time a word is taken out of memory. When the COUNT equals zero, a chaining or refill operation takes place. Generally, the REFILL field of the DCW register contains the address of the next DCW when the present DCW is exhausted (i.e., count equals zero). The new address from refill is sent to the MBR which fetches the new DCW from main memory and stores it in the DCW register 12. For initial set-up arrangements, the first DCW address is stored in the DCW ADDR register 14 which sends the address to the MBR which in turn fetches the first DCW from main memory. After the initial set-up, however, the DCW register operates under the control of the REFILL and COUNT fields of the DCW register 12. The modified ADDR and COUNT fields of the DCW are also sent to the byte buffer register (BBR) and stored in the byte buffer in a manner to be described below.

There are two basic operations performed by this asynchronous data processing system. One is the transfer of bytes between the byte buffer 16 and a plurality of input-output units (I/O). The other is to perform assembly and disassembly operations on data flowing between the byte buffer and the CPU main memory. In an assembly operation, nine-bit bytes which have been stored in byte buffer 16 from the I/O channels are assembled into a sixty-four bit or eight byte computer word which is then transferred to the CPU main memory. The 9th bit of each byte is used for parity checking and to generate the word parity (not shown). In a disassembly operation, a computer word which has been stored in the word register 10 is disassembled into eight bytes for storage in byte buffer 16 and subsequent transferral therefrom to the appropriate I/O channel. A parity bit for each byte is generated before the byte is stored in the byte buffer (not shown).

The present system is designed to service four I/O channels which are connected to buffer 16 via a nine line (eight data bits plus one check bit) byte input bus 17 and a nine line byte output bus 18. The individual channels are addressed or connected by means of a four line fixed address (FA) bus 19 which is connected between a S/R channel priority selector 21 and a byte address register (BAR) 23. Any I/O desiring to use buffer 16 has priority over any assembly or disassembly operation which, of course, also requires the use of buffer 16.

When an I/O channel desires to use buffer 16, a suitable channel trigger may generate a service request (S/R) signal which may be applied as an input to a NEXT CYCLE PRIORITY circuit 22. When the CPU has data to be sent to an I/O channel, it requires the use of the byte buffer 16 also. To initiate the disassembly operation in order to convert the 64-bit computer word to eight bytes (byte parity bit generator not shown), the CPU will generate an appropriate memory request signal which sets the appropriate one of the assembly-disassembly (A/D) triggers to provide an A/D signal which is also applied to an input of the NEXT CYCLE PRIORITY circuit 22. In a manner to be described below, buffer 16 also generates an A/D signal automatically when it is holding channel data to be transferred to the CPU main memory.

NEXT CYCLE PRIORITY circuit 22 is a conventional priority circuit which produces on an output line 24 an S/R NEXT signal whenever an S/R signal appears on its input. Only when an A/D signal appears without an S/R signal does the circuit 22 produce an A/D next signal on an output line 26.

Byte buffer 16 and its associated circuits operate asynchronously under the control of READ/WRITE CONTROLS (R/W CTLS) 28 which are more fully disclosed and claimed in a pending application by R. J. Furlong for "Automatic Memory Start Circuit for Asynchronous Data Processing System" Serial No. 248,776 and assigned to the same assignee as the present application. Controls 28 include a delay line memory which must be energized or pulsed each byte cycle by either an A/D SEL or an S/R SEL signal on inputs 30 and 32, respectively, in order to produce the necessary memory clock pulses to control a write-only or read-only operation.

R/W CTLS 28 generates a FEEDBACK pulse 29 at a predetermined time before the end of each cycle. If an A/D SEL or S/R SEL signal is present on either inputs 30 or 32 at this time, the address of the next I/O channel to be serviced is gated into the byte address register (BAR) 23 and a start pulse is produced to energize the delay line thereby producing the required clock pulses for another cycle of byte buffer 16. If CTLS 28 are dormant when an S/R SEL or A/D SEL appears, then a suitable pulse will be generated to provide a memory start pulse in place of FEEDBACK 29.

Such an arrangement reduces the delays between buffer cycles since a finite time is required to ripple through the logic circuits, flip triggers, set registers, and permit counters to settle down. The exact time before the end of a byte cycle at which FEEDBACK pulse 29 is produced may be determined by the particular logic components utilized and should be timed so that the read or write delay line clock in control 28 is energized at the end of each current cycle when the FEEDBACK pulse 29 has already sensed and gated the address register for the following read-only or write-only cycle.

Another input to R/W CTLS 28 is a R/W signal derived from the R/W triggers which will be discussed below in connection with the control and addressing circuits for byte buffer 16. This signal determines whether the assembly-disassembly operation or a channel service operation involves writing or reading the byte buffer 16. For a buffer read operation, an RD signal appears on output line 34, and for a write operation a WR signal appears on output line 36.

These two signals merely represent opposite directions of current flow through the drive windings of the core buffer 16. For four I/O channels, byte buffer 16 has four sections each of which has an A data portion, a B data portion, and a Data Control Word (DCW) portion. Each portion has eight levels, each of which stores one byte. All data words and DCW's transferred to or from buffer 16 first pass through a byte buffer register (BBR) 38.

In addition to the fixed channel address F/A from bus 19, in an I/O channel service request operation, BAR 23 is provided with byte addresses from a byte status unit BSU, one of which is associated with each I/O channel and is adapted to be gated onto the S/R BAR address bus 46. Each BSU includes a three stage binary counter 40, an A/B trigger 42 and an R/W trigger 44. Each A/B trigger 42 may actually form the fourth stage of one of the counters 40 and each A/B trigger is automatically flipped each time its associated counter 40 resets from a count of "7" to "0." A more detailed description of the BSU's and other S/R controls will be presented in connection with FIGURE 2.

However, as an example, if the FA appearing on bus 19 is that of channel 1, then data bytes will be transferred between I/O channel 1 and buffer 16 under the control of BSU 1 which is gated onto S/R BAR address bus 46. The state of A/B trigger 42–1 determines whether the A or B data portion of the channel 1 section of buffer 16 is to be used. Counter 40–1 steps the buffer section through the eight levels of the selected A or B portion. The R/W trigger is set externally by the CPU for a channel read-only-to-buffer (R) operation or a buffer write-to-I/O (W) operation and remains set in this position until reset by the CPU. Byte buffer 16 is therefore addressed randomly and operates on a non-regenerative basis so that the data is destroyed after it is read out of the buffer cores and the buffer can handle data at twice the speed of standard synchronous buffers which require one-half of each timing cycle for regeneration. With this system, the second half cycle can be utilized to perform another read-only or write-only operation which is completely random.

If the CPU wishes to send data to the I/O channels, it generates appropriate A/D1 A/D2, A/D3 or A/D4 signals corresponding to the four I/O channel sections of byte buffer 16. These signals are applied to the four inputs of an A/D PRIORITY SELECTOR 50 which assigns priority when more than one A/D request is received. If no S/R signal appears at the input of NEXT CYCLE PRIORITY circuit 22, then the A/D NEXT signal output on line 26 gates the fixed address F/A of the selected channel onto the F/A bus 52 in the form of an A/D SEL. The gated addresses are individually referenced as A/D1 SEL, A/D 2 SEL, A/D3 SEL and A/D4 SEL. The selected A/D1–4 SEL forms a fixed address F/A and also gates the appropriate status counter to the A/D BAR ADDRESS BUS 56 to be stored in the BAR 23.

Each A/D operation is under the control of an A/D status counter which is gated to the A/D BAR address bus 56 during each A/D operation. This counter corresponds to counters 40 and keeps track of the levels of each section of buffer 16. As before, the A/B trigger associated with each channel determines whether the A/D operation uses the A or B portion of the selected buffer section. Also associated with each counter for use in an A/D operation is one of the four R/W triggers 60 which are externally set by a control pulse from the CPU for a read-only or write-only cycle depending upon whether the I/O channel is sending or receiving data. The read (R) or write (W) control latch is set once at the activation of a channel. Both the A/B and R/W triggers used for an A/D operation may be physically the same channel A/B and R/W triggers 42 and 44 used in a service request operation. Because the A/D operation and the S/R operation are complementary for any given channel considered the complementary outputs may be used.

In an A/D operation, when one of the R/W triggers 60 is set to R (read), a word assembly sequence occurs under the control of a type cycle counter to be described below. In general, the bytes are read out of byte buffer 16, assembled in word register 10 into an eight byte computer word and transferred to main memory via the MPR to the address stored in the ADDR field of the Data Control Word register. The exact sequence requires the data control word byte to be first read out and assembled in the DCW register 12, then A or B data bytes are read out and assembled in word register 10. The CPU is then signaled that a word is ready for transmission. The DCW, ADDR and COUNT fields are incremented and decremented, respectively, by the control circuits 13. If COUNT does not equal zero, the modified DCW is recycled into the DCW portion of the selected I/O channel section of buffer 16 for further use.

In an A/D operation, when one of the R/W triggers 60 is set to W (write), the DCW is read out of the byte buffer and assembled in the DCW register 12. The CPU is then signaled that a word is being requested. Once the word transmission has been executed and the appropriate A/D latch has been set by the CPU the priority selector 50 will compete with service request operations for use of the byte buffer. The data word is then read out of word register 10, disassembled, and stored as eight bytes in the A or B data portion of the buffer section. The data control word is appropriately modified and recycled back into the DCW portion of the buffer section.

FIGURE 4 shows the addresses of the bytes stored in buffer 16. It can be seen that the A data portions use addresses 0–31, the B data portions addresses 32–63, and the DCW portions addresses 71–95.

Turn now to FIGURE 2 for a more detailed description of the I/O channel service request or S/R operation.

An S/R operation is initiated by the generation of one or more S/R signals, S/R1, S/R2, S/R3, S/R4, by the corresponding I/O channel triggers (not shown). These S/R signals are applied to the I/O channel priority selector 21 which selects one I/O channel in accordance with a predetermined priority and provides an S/R SEL signal on one of the lines of bus 19. Bus 19 actually contains four lines which are outputs of an appropriate priority circuit contained in selector 21. The individual outputs of selector 21 are S/R1 SEL, S/R2 SEL, S/R3 SEL, and S/R4 SEL which appear on the corresponding bus lines 19–1, 19–2, 19–3 and 19–4. Any of these outputs may serve as the S/R SEL input (derived from the output of an OR circuit not shown) to which the signals S/R1–4 are applied to NEXT CYCLE PRIORITY circuit 22 in FIGURE 1. These S/R1–4 SEL signals are also each applied to an input of corresponding AND gates 72 whose function will be described in connection with the description of an S/R operation. Because lines 19 are actually the outputs of logical circuits in selector 21, they represent the fixed addresses F/A of the I/O channels. The four byte status counters 40 and A/B triggers 42 are reproduced in FIGURE 2. The A/B triggers 42 (FIGURE 1) are each shown as the fourth stage of the corresponding counter 40 (FIGURE 2). This fourth stage is also arbitrarily assigned the binary-coded value of "32" for a better understanding of its function in the address codes associated with BAR 23 (see FIGURE 4).

An S/R SEL signal appears on bus 19 when the selected I/O unit holds data to be transmitted to buffer 16 or is requesting data to be taken from buffer 16. Therefore, the four S/R SEL signals are each applied to one input of corresponding AND gates 72 whose other input is FEEDBACK pulse 29 from the delay line in CTLS 28. The output of each of the AND gates 72 is applied to its corresponding byte status counter 40 which steps one count for each byte cycle to read out or write into the eight byte levels of each portion of byte buffer 16.

The A and B portions of each buffer section are used alternately. That is, after the A portion, for example, is filled with bytes from an I/O channel, the A/B trigger in the byte status unit is automatically flipped to its B state so that the next operation requiring data to be stored in the buffer utilizes the B portion thereof. Whenever an A or B portion of the buffer contains data to be sent to the CPU main memory, an appropriate A/D trigger to be discussed later is set to provide an A/D signal.

Let us now assume that priority selector 21 has selected I/O channel 1 as the next channel to be serviced by byte buffer 16. The S/R–1 SEL signal appears to gate individual AND gates 74 which are each connected to the outputs of the three stages of each of the counters 40 and triggers 42. The outputs of these gates are connected to the corresponding lines 56–1, 56–2, 56–4, 56–32 of S/R BAR address bus.

Furthermore, the lines 56–8 and 56–16 are connected to the appropriate bus lines 19 in order to from the fixed address portion of the byte buffer address. Line 19–1 is not connected to any of the lines 56 since, by reference to FIGURE 4, it is seen that none of the address in the A or B portion of the buffer section corresponding to I/O channel 1 requires binary 16 or binary 8. When S/R2 SEL appears on line 19–2 it is interpreted as a binary 8 code in the F/A and is applied to line 56–8. In like manner, the S/R2 SEL signal is applied to line 56–16 and the S/R4 SEL signal is applied to both lines 56–8 and 56–16.

As shown in FIGURE 2, lines 56 are each connected to one input of corresponding AND gates 76. The other input of each of the AND gates 76 is an S/R ADDR SEL line which is generated in the read/write control circuit 28 by FEEDBACK pulse 29 or its equivalent. The channel address is then gated through AND gates 76 and associated OR gates 78 to the BAR 23. The R/W trigger for the channel selected is also gated to control the byte buffer read or write controls 28.

Upon the occurrence of a FEEDBACK pulse 29 near the end of the byte cycle a Service Response (not shown) is issued to the selected channel to cause a disconnect and to step counter 40–1 to reflect the new status. The S/R I/O Channel Priority Selector 21 will then cause the next channel awaiting service (if any) to be gated through in a similar manner and begin a setup for the next buffer cycle.

An A/D operation will be described in connection with FIGURE 3 with reference to both FIGURES 1 and 2. In FIGURE 3, an A/D priority selector 50 is reproduced. The four inputs of the A and D selector 50 are connected to corresponding A/D triggers 82. The input of each trigger 82 is connected to a corresponding one of CPU request lines 84 and also to the output of corresponding AND gates 86 (FIGURE 2). The inputs from both AND gates 86 and lines 84 from CPU may be identified as SET A/D1, 2, 3, 4, respectively.

The inputs to each of the AND gates 86 is a corresponding one of the S/R SEL bus lines 19 and also the output of an AND gate 88. The four inputs to the AND gate 88 are the three status counter address lines 56–1, 56–2 and 56–4, i.e. a count of "7," and also FEEDBACK pulse 29 from control circuit 28 in FIGURE 1. AND gates 88 and 86 perform the logical function of signalling for an A/D operation whenever a section of the byte buffer 16 has been filled with data bytes from one of the I/O channels. Such a function occurs automatically and an A/D operation will occur as soon as the priority circuits permit it.

Referring to FIGURE 2 again, it will be noted that corresponding inverter 90 is connected to the A/B trigger associated with each channel. The outputs of the inverters 90 are expressed as $\overline{A/B}$ and logically expresses the function of the A/B trigger wherein an A portion, for example is being utilized on a current cycle for an S/R operation, then a subsequent A/D operation involving a transferral of data to or from a memory must occur in the B portion. These $\overline{A/B}$ signals are each applied to a corresponding one of four lines 92 which in turn are connected to corresponding inputs of four AND gates 94.

The outputs A/D1–4 of A/D triggers 82 may be combined in an OR circuit (not shown) to provide an A/D signal which is applied as one of the inputs to the next cycle priority circuit 22 in FIGURE 1. If no S/R is present, A/D priority selector circuit 50 provides an A/D SEL line on one of the four lines of its output bus 52. These lines represent the binary coded fixed address in the same manner as the lines 19 do with respect to an S/R operation and are gated to BAR 23 to form part of the byte address. It will be noted by reference to FIGURE 4 that no A/D1 SEL output is required when the first channel is selected. However, the other lines 52 form the fixed address for the BAR in an A/D operation.

Lines 52–1, 2, 3 are connected to corresponding lines 100 in the same manner in which lines 19 are connected to lines 56 in FIGURE 2. These lines 100 are each connected to one input of a corresponding AND gate 102 in the same manner in which lines 56 are connected to AND gates 76. The other input of each of the AND gates 102 is an A/D ADDR SEL line which is generated in R/W controls 28 upon the coincidence of a FEEDBACK pulse 29 and an A/D signal from one of the triggers 82.

The detailed operation of an assembly or disassembly sequence will now be described. The A/D1–4 SEL outputs from A/D selector 50 one of which may be generated upon the setting of an A/D trigger 82 and the generation of an A/D NEXT signal, are each applied to the input of an OR circuit 104 whose output energizes a single shot (SS) multivibrator 106 which generates a SET pulse for application to a two-stage, binary type cycle counter 108. This SET pulse sets counter 108 to a count of "1," i.e., stage 1 is set ON and stage 2 is set OFF. Both stages of counter 108 are connected to an OR circuit 110. The output of stage 1 is also connected to line 100–64 in the A/D BAR bus 100.

It will be recalled that in an assembly or disassembly sequence, the first and third steps of the sequence require transferral of the DCW between the DCW register 12 and byte buffer 16. Therefore, for the first and third steps the DCW must be addressed. Consequently, it can be seen that when counter 108 has stage 1 ON, line 64 will be energized to put the byte buffer addresses in the range of the DCW locations as shown in FIGURE 4. Since line 100–32 is not needed to address the DCW's, an inverter 112 is connected between the output of the first stage of counter 108 and all of the inputs of AND gate 94 thereby inhibiting any output from OR circuit 95 when a count of "1" or "3" is held in counter 108.

A/D status counter 54 is also reproduced in FIGURE 2. It is stepped by the output of an AND gate 112 whose two inputs are the output of OR gate 110 and the memory FEEDBACK pulse 29 from controls 28.

SS 106 is utilized to initiate the SET condition of counter 108 by forcing it to a "1" count. However, after the first step in an A/D sequence of reading out and assembling the DCW bytes, the counter is stepped to a count of "2" by the output of an AND gate 114, said gate provides an output when the status counter 54 is standing at a count of "7" and FEEDBACK pulse 29 appears at one of the inputs to AND gate 112. When counter 108 holds a count of "2" its first stage is OFF and its second stage is ON and therefore an output from inverter 116 results. An output from one of the AND gates 94 will energize line 100–32, thereby enabling A or B data addresses 0–63 to be selected. Line 100–64 is not energized in this step of the sequence.

The A/D status counter 54 advances under control of the FEEDBACK pulse 29 until eight data bytes are processed between the byte buffer 16 and the data word register 10. When counter 54 is standing at a count of "7" and FEEDBACK pulse 29 appears at one of the inputs to AND gate 112, counter 108 is advanced to a count of "3." Eight DCW bytes are then read into the byte buffer similar to a manner described when the Type Cycle Counter 108 had a count of "1." After eight DCW bytes are transmitted the Type Cycle Counter 108 will be advanced to a count of "0" and the A/D operation is complete.

While there have been shown and described and pointed out the fundamental novel features of the invention as applied to a preferred embodiment, it will be understood that various omissions, substitutions, and changes in the form and detail of the system illustrated and in its operation may be made by those skilled in the art without departing from the spirit of the invention. It is the intention, therefore, to be limited only as indicated by the scope of the following claims.

What is claimed is:

1. An asynchronous data processing system for transferring data between the main memory of a central processor and a plurality of input-output devices wherein said input-output devices operate upon data bytes and said main memory operates upon data words stored in a word register, a data word containing N data bytes and a byte cycle being required to transfer each data byte, comprising (a) a plurality of byte buffers addressable on a byte basis for temporarily storing data words each buffer being assigned to a different predetermined input-output device having a fixed address, (b) single-byte address storage means common to all said buffers, (c) means individual to each input-output device for successively gating to said storage means the addresses of the N byte positions of a data word within each fixed address to control the transfer of data bytes between an addressed buffer and its assigned input-output device, (d) single addressing means common to all said buffers and responsive to a memory request signal from the central processor for successively gating to said storage means the addresses of the N byte positions within each buffer to control the transfer of a data word, a byte at a time, between each of said buffers and said word register, and (e) means responsive to an input-output device service request signal during a data word transfer between one of said buffers and said word register for interrupting said common addressing means at the end of the next byte cycle to initiate a transfer of data bytes between the requesting input-output device and said bye buffer under the control of the individual addressing means associated with the requesting input-output device.

2. An asynchronous data processing system as defined in claim 1 wherein each buffer has two data word portions which are addressed alternately by said addressing means and each of which contains N addressable byte positions.

3. An asynchronous data processing system as defined in claim 2 wherein each buffer also has a control word portion for holding an N-byte data control word which controls the transfer of a data word between said buffer and said main memory.

4. The asynchronous data processing system as defined in claim 1 wherein said common addressing means includes means for storing the address of the next byte to be transferred between an addressed buffer and said word register when an interruption occurs.

5. The asynchronous data processing system as defined in claim 1 further comprising means selectively responsive to the presence of an input-output device service request and a memory request during a present byte cycle to cause said individual and said common addressing means, respectively, prior to the termination of the present cycle to gate to said byte address storage means the buffer address for the next byte cycle.

6. The asynchronous data processing system as defined in claim 1 further comprising control means responsive to the central processor to generate random read only and write only cycles of buffer operation.

References Cited by the Examiner

UNITED STATES PATENTS 3,061,192 10/1962 Terzian ---------- 340—172.56

ROBERT C. BAILEY, *Primary Examiner.*

MALCOLM A. MORRISON, *Examiner.*

W. M. BECKER, *Assistant Examiner.*